US010910890B2

(12) United States Patent
DeFilippis

(10) Patent No.: US 10,910,890 B2
(45) Date of Patent: Feb. 2, 2021

(54) ELECTRIC MACHINE

(71) Applicant: SPAL AUTOMOTIVE S.R.L., Correggio (IT)

(72) Inventor: Pietro DeFilippis, Varazze (IT)

(73) Assignee: SPAL AUTOMOTIVE S.R.L., Correggio (IT)

(*) Notice: Subject to any disclaimer, the term of this patent is extended or adjusted under 35 U.S.C. 154(b) by 0 days.

(21) Appl. No.: 16/450,099

(22) Filed: Jun. 24, 2019

(65) Prior Publication Data
US 2019/0312471 A1 Oct. 10, 2019

Related U.S. Application Data

(62) Division of application No. 14/908,978, filed as application No. PCT/IB2014/063612 on Aug. 1, 2014, now Pat. No. 10,374,472.

(30) Foreign Application Priority Data

Aug. 1, 2013 (IT) .............. BO2013A0432

(51) Int. Cl.
*H02K 1/14* (2006.01)
*H02K 3/34* (2006.01)
(Continued)

(52) U.S. Cl.
CPC ............. *H02K 1/146* (2013.01); *H02K 3/34* (2013.01); *H02K 3/345* (2013.01); *H02K 5/04* (2013.01); *H02K 9/22* (2013.01); *Y10T 29/49009* (2015.01)

(58) Field of Classification Search
CPC ............ H02K 9/22; H02K 1/146; H02K 3/34; H02K 3/345; H02K 5/04; Y10T 29/49009
See application file for complete search history.

(56) References Cited

U.S. PATENT DOCUMENTS

2009/0085422 A1  4/2009  Kusawake et al.
2010/0019588 A1* 1/2010  Makino .............. H02K 15/0031
                                                        310/52
(Continued)

FOREIGN PATENT DOCUMENTS

EP    1317048 A2    6/2003
EP    1453188 A2    9/2004
(Continued)

OTHER PUBLICATIONS

English translation of Japanese Office Action dated May 22, 2018 for counterpart Japanese Patent Application No. JP2016530662.
(Continued)

*Primary Examiner* — Livius R. Cazan
(74) *Attorney, Agent, or Firm* — Shuttleworth & Ingersoll, PLC; Timothy J. Klima

(57) ABSTRACT

An electrical machine includes a casing including a base wall provided with a projection projecting from the base wall towards the inside of the casing. A stator includes a core having a plurality of pole shoes, a plurality of conductors wound on the pole shoes to form a plurality of coils constituting a stator winding. Insulators are interposed between the core and the stator winding. A coil of the winding has an end portion engaged with the projection for heat exchange. The insulators include a housing for a first number of turns of the coil and a second housing for a second number of turns of the coil. The first and second housings are shaped such that a layer of the turns of the end portion abutted against the projection is defined by stretches of the conductors all substantially coplanar with each other.

19 Claims, 3 Drawing Sheets

(51) Int. Cl.
  *H02K 5/04* (2006.01)
  *H02K 9/22* (2006.01)

(56) References Cited

U.S. PATENT DOCUMENTS

| | | | |
|---|---|---|---|
| 2010/0171380 A1* | 7/2010 | De Filippis | H02K 1/185 310/64 |
| 2013/0020891 A1 | 1/2013 | Kishi et al. | |
| 2014/0375148 A1 | 12/2014 | Narita et al. | |

FOREIGN PATENT DOCUMENTS

| | | |
|---|---|---|
| JP | H11150900 A | 6/1999 |
| JP | 2000125512 A | 4/2000 |
| JP | 2004350450 A * | 12/2004 |
| JP | 2004350450 A | 12/2004 |
| JP | 2010536313 A | 11/2010 |
| JP | 201119320 A | 8/2012 |
| JP | 201327173 A | 2/2013 |
| RU | 2280935 C2 | 7/2006 |
| RU | 2486652 C2 | 6/2013 |
| SU | 1271385 A3 | 11/1986 |
| WO | WO2009019562 A2 | 2/2009 |
| WO | WO2013105214 A1 | 5/2015 |

OTHER PUBLICATIONS

International Search Report and Written Opinion dated Jul. 27, 2015 from counterpart App No. PCT/IB2014/063612.
Russian Search Report dated Dec. 18, 2017 from counterpart Russian App No. 2016106629/07.
Russian Office Action dated Dec. 22, 2017 from counterpart Russian App No. 2016106629/07.

* cited by examiner

ELECTRIC MACHINE

This application is a divisional of U.S. patent application Ser. No. 14/908,978 filed Jan. 29, 2016, which is a National Phase of International Application PCT/IB2014/063612 filed Aug. 1, 2014 and designated the U.S.

This application claims priority to Italian Patent Application No. BO2013A000432 filed Aug. 1, 2013. All of the above applications in their entirety are incorporated by reference herein.

TECHNICAL FIELD

This invention relates to an electrical machine and in particular to an electric motor of the brushless type.

BACKGROUND ART

In general, a reference prior art type of electric motor comprises a casing having inside a stator of the wound type, rigidly constrained to the casing, and a rotor, for example with permanent magnets, rotatably constrained to the casing.

An electronic module or control electronics, connected to the stator, is inserted in the casing for supplying power to the stator.

A cap closes the casing to form a closed container from which connection terminals protrude for the power supply of the control electronics.

The electrical machines used as a reference for this invention are in particular of the sealed type, that is, sealed electrical machines.

It is known that the windings of an electrical machine, in particular the stator windings, are made using a plurality of coils of conducting material, usually copper, made of a conducting wire wound around the pole shoes of the stator ferromagnetic core of the electrical machine.

The stator comprises insulators, known in the sector with the term "front pieces", positioned on axially opposite sides of the ferromagnetic core, interposed between the winding and the pole shoes.

An electric current which may even have a high nominal value passes through the winding and that causes heating phenomena due to the Joule effect which extend over the entire dimensions of the winding and in the zones of the electrical machine adjacent to it.

In particular, it has been found that said heating phenomenon causes a deterioration of the conductivity properties of the conducting wire, which consequently produces a greater resistance to the passage of electric current, causing a high and often unacceptable level of energy dissipation.

Moreover, the heating of the winding may cause a rapid deterioration of the insulating characteristics of the above-mentioned layer of electrically insulating material interposed between the winding and the corresponding pole shoe, as well as excessive heating of the electronic module.

That situation is particularly bad in closed type rotary electrical machines, in which the windings are immersed in the container, formed by a casing and cap, which does not have air recirculation.

A solution intended to overcome said difficulty is described in the document WO2009019562 in the name of the same Applicant.

In that solution, the inside of the casing is provided with a plurality of stop portions, in the form of projections of a base wall of the casing, against which the stator windings abut, suitably insulated, for more effective heat exchange with the cap.

In the case of high powered motors, at around one kW, the prior art solutions are still not completely satisfactory in terms of dispersing the heat produced in the windings.

In this context, the main aim of this invention is to overcome the above-mentioned disadvantages.

DISCLOSURE OF THE INVENTION

One aim of this invention is to provide an electrical machine in which the cooling of the stator winding is further improved compared with the prior art solutions.

The technical purpose indicated and the aims specified are substantially achieved by an electrical machine according to the present disclosure.

BRIEF DESCRIPTION OF DRAWINGS

Further features and advantages of this invention are more apparent in the detailed description below, with reference to a preferred, non-restricting, embodiment of an electrical machine as illustrated in the accompanying drawings, in which.

DETAILED DESCRIPTION OF PREFERRED EMBODIMENTS OF THE INVENTION

With reference to the accompanying drawings, the numeral 1 indicates an electrical machine according to the present invention, in particular a brushless motor.

The machine 1, having an axis R of rotation, comprises, in short, a casing 2, a cap, not illustrated, closing the casing 2, a stator 3, integral with the casing 2, a rotor and a control circuit not illustrated.

Figure 1:
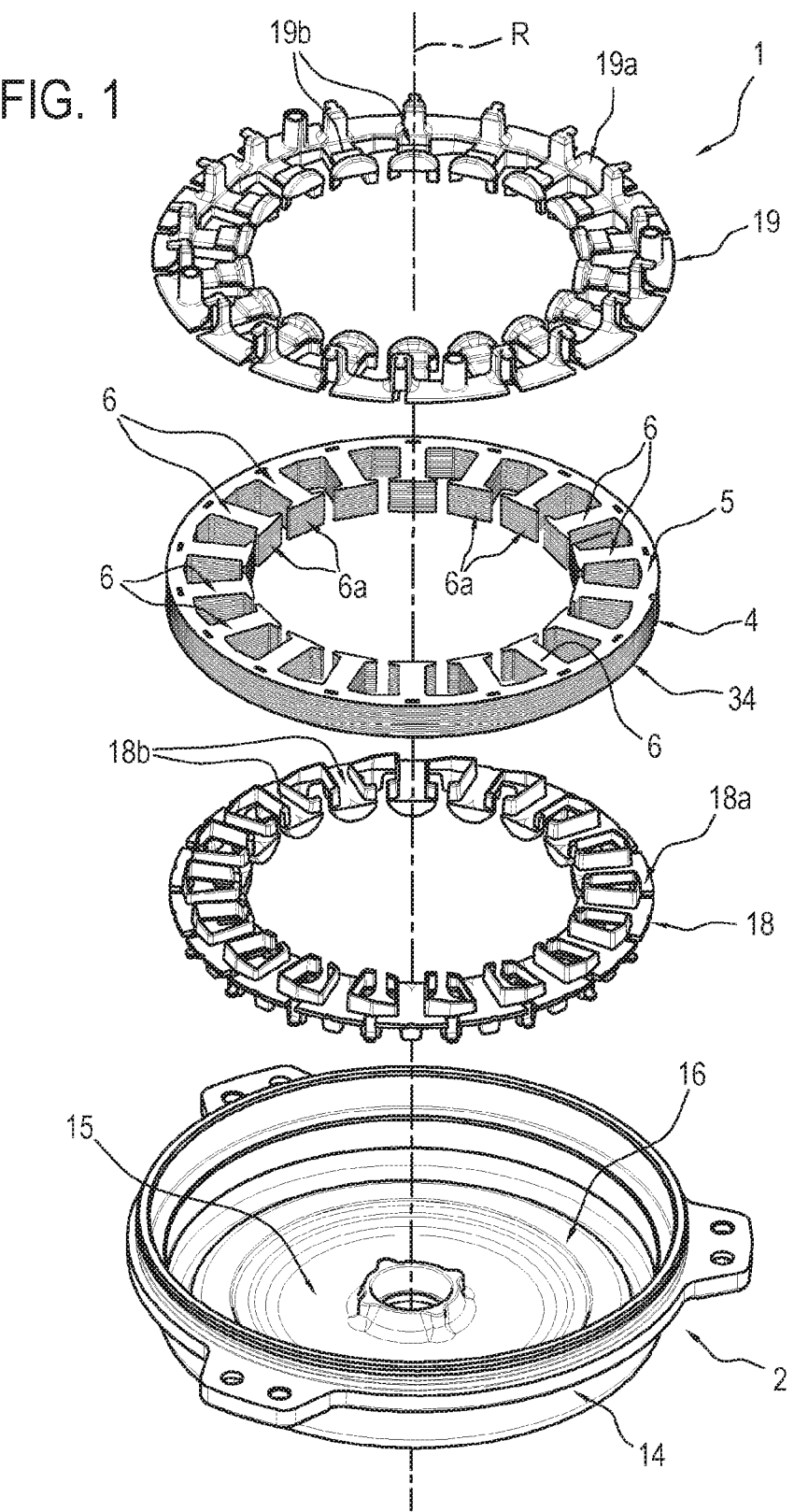
FIG. 1 is a schematic partly exploded perspective view, with some parts cut away for greater clarity, of an electrical machine according to this invention.

The stator comprises a ferromagnetic core 4 which has, as shown in FIG. 1, an outer portion shaped as an annular crown 5 and a plurality of pole shoes or teeth 6 extending from the crown 5 towards the axis R of rotation and each having a respective end 6a.

The core 4, in substantially known manner, comprises a plurality of superposed plates 7.

The stator 3 comprises a plurality of phase conductors 8 wound on the ferromagnetic core 4, in particular on the pole shoes 6.

The conductors 8 are wound on the pole shoes 6 and form a plurality of coils 9 each wound on a corresponding pole shoe 6; the set of coils 9 forms the so-called stator winding 10.

Each coil 9 is formed by a predetermined total number N of turns 11 wound around the respective pole shoe 6.

The number of turns 11 for each coil 9, and the diameter of the conductors 8, is determined, in a substantially known manner, during design of the motor, in particular as a function of the expected performance of the motor.

The radial and axial dimensions of the stator teeth and the diameter of the conductors, for example, contribute to the determination of the number of turns per coil.

Each coil 9 has two end portions 12, 13 which are aligned with each other according to a direction parallel with the axis R.

The casing 2 comprises a lateral wall 14 and a base wall 15 which form a cup-shaped structure.

The base wall 15 comprises a projection 16 projecting towards the inside of the casing 2 according to a direction parallel with the axis R of rotation.

In other words, the projection 16 extends away from the lying plane of the base wall 15 towards an inner space of the electric motor 1, in particular of the casing 2.

In the preferred embodiment illustrated, the projection 16 is substantially annular and extends about the axis R of rotation.

The coils 9 engage with the projection 16 for heat exchange with the casing 2 by means of the projection 16.

More precisely, the stator 3 is inserted in the casing 2 in such a way that the coils 9 abut against the projection 16.

As illustrated, all of the end portions 12 facing towards the base wall 15 of the casing 2 engage with the projection 16.

More specifically, all of the end portions 12 facing towards the base wall 15 of the casing 2 abut against the projection 16.

To guarantee suitable electrical insulation between the stator winding 10 and the casing 2, the motor 1 comprises an electrical insulator 17 interposed between the coils 9 and the projection 16.

Advantageously, the insulator 17 is heat conductive in such a way as to optimise the heat exchange between the winding 10 and the casing 2.

In a preferred embodiment, the insulator 17 is in the form of a sheet or a piece of a sheet of Silpad® which guarantees suitable mechanical strength, thermal conductivity and electrical insulation.

In order to guarantee electrical insulation between the stator winding 10 and the ferromagnetic core 4, the electrical machine 1 comprises a first and a second insulator 18, 19, commonly known as "front pieces", positioned between the core 4 and the coils 9.

The front piece 18, for example the front piece facing the base wall 15 of the casing 2, and the front piece 19 have a radially external part 18a, 19a which is substantially annular from which radial arms 18b, 19b extend, at each tooth 6, extending towards the axis R.

The front piece 19 is positioned on the opposite side to the front piece 18 with respect to the core 4; the front pieces 18, 19 clasp the core 4 insulating it from the winding 10.

Advantageously, the front pieces 18, 19 are shaped, in particular a relative outer surface with respect to the core 4, in such a way that the end portions 12 of the coils 9 abutted against the projection 16 have at least one contact surface, comprising the stretches of the turns at the end portion 12, which is substantially flat so as to maximise the surface of heat exchange with the casing 2.

In other words, as described in more detail below, the front pieces 18, 19 are shaped in such a way that at least the stretches of the outermost turns 11 with respect to the core 4, abutted against the projection 16, are all coplanar without overlapping of the conductor 8.

Figure 4:
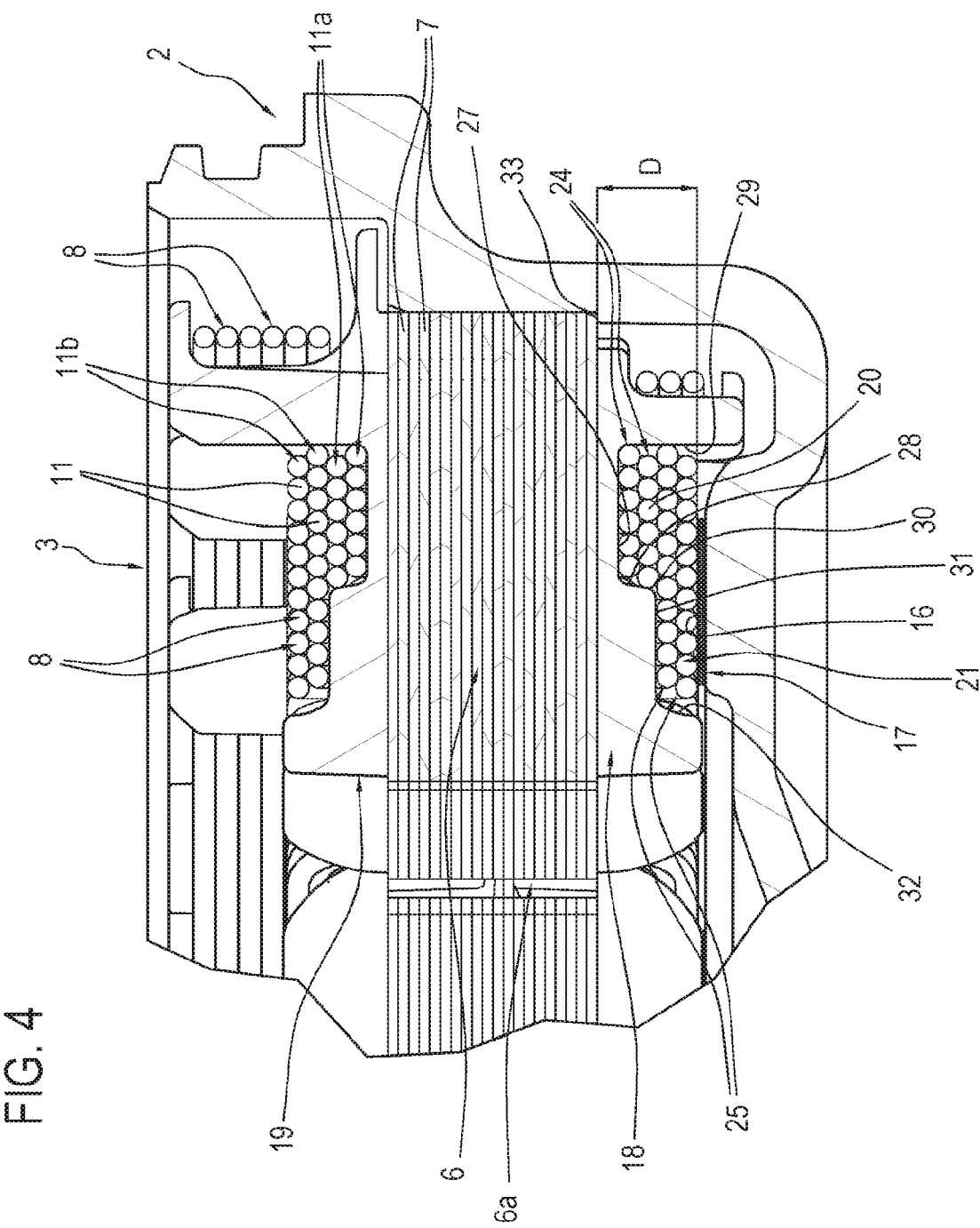
FIG. 4 illustrates a detail of the cross-section of FIG. 2.

With reference in particular to FIG. 4, it may be observed that in the preferred embodiment illustrated, the front piece 18 has, for each tooth 6, that is, for each coil 9, a housing 20 for a predetermined number N1 of turns 11a, part of the total number N of turns 11, and a second housing 21 for a predetermined number N2 of turns 11b, part of the total number N of turns 11.

The predetermined total number N of turns for the pole shoes 6 of the machine 1 is given by N1+N2.

The front piece 19 has, for each tooth 6, that is, for each coil 9, a housing 22 for the turns 11a and a second housing 23 for the turns 11b.

In an alternative embodiment not illustrated, only the front piece 18 has the housings 20, 21 to optimise the distribution of the turns 11 on the corresponding tooth 6 whilst the front piece 19 is of the conventional type.

For the sake of simplicity, reference is made hereinafter to a single tooth 6 and to a single coil 9 as all the coils 9 are preferably wound on the respective tooth 6 in the same fashion.

As illustrated, N1 turns 11a are positioned in the housings 20, 22 whilst N2 turns 11b are positioned in the housings 21, 23.

Preferably, in order to optimise the winding of the stator 3, the N1 turns 11a are positioned in the respective housing in an even number of superposed layers 24 according to a direction parallel to the axis R of rotation.

Preferably, in order to optimise the winding of the stator 3, the N2 turns 11b are positioned in the respective housing in an even number of superposed layers 25. In practice, the front pieces 18, 19, preferably the radial arms 18b, 19b of the front pieces, comprise the housings 20, 22 for a first part N1 of the predetermined total number N of turns 11 and the housings 21, 23 for a second part N2 of the predetermined total number N of turns 11 of the coil 9.

Preferably, the housings 20, 22 are aligned according to a direction parallel with the axis R of rotation.

Preferably, the housings 21, 23 are aligned according to a direction parallel with the axis R of rotation.

Preferably, the front pieces 18, 19 at the arms 18b, 19b are symmetrical with respect to the ferromagnetic core 4.

The housings 20, 22 take the form of a throat which extends in the front piece 18, 19, in particular in the arm 18b, 19b, according to a direction transversal, in particular at right angles, to a stator radius.

The housings 21, 23 take the form of a throat which extends in the front piece 18, 19, in particular in the arm 18b, 19b, transversal, in particular perpendicular, to a stator radius.

Figure 2:
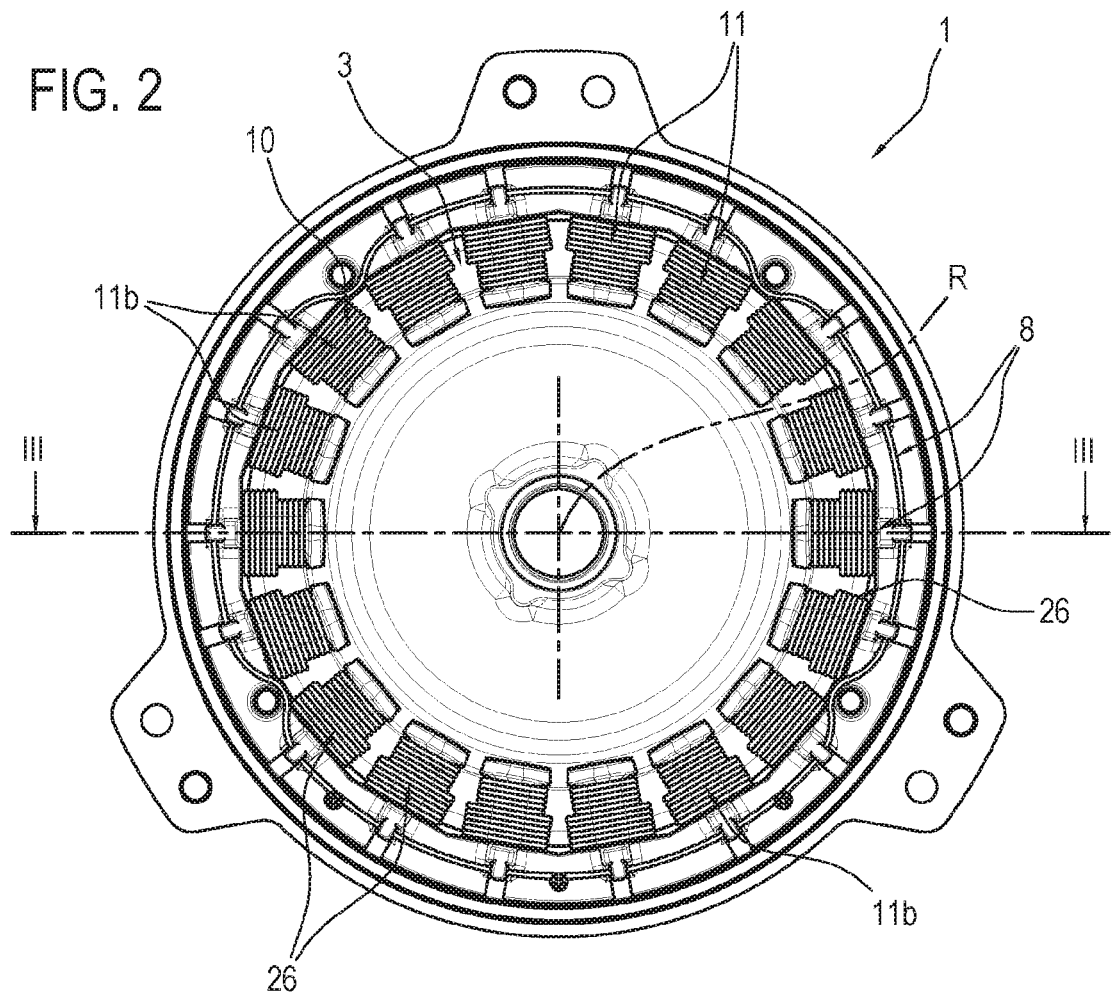
FIG. 2 is a schematic top plan view, with some parts cut away for greater clarity, of the electrical machine of FIG. 1.
Figure 3:
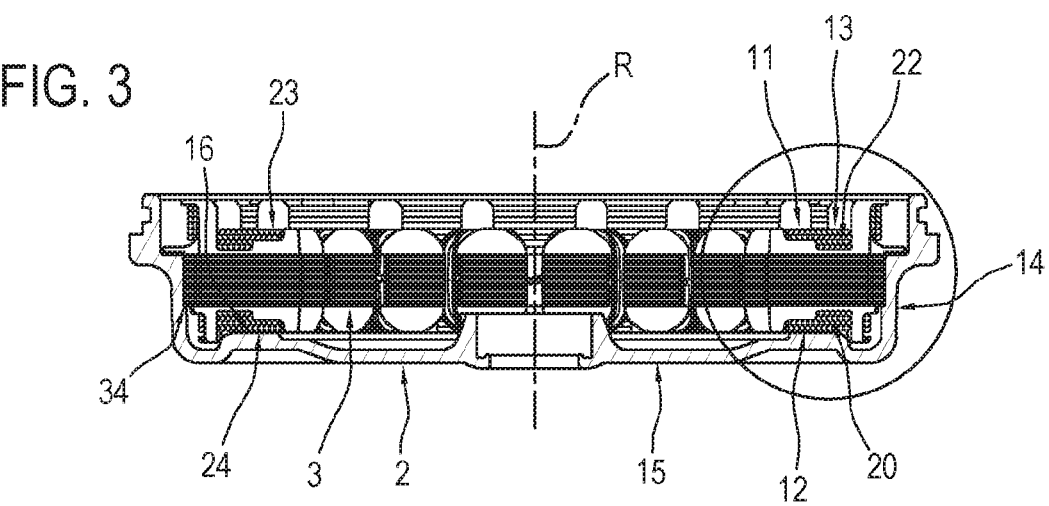
FIG. 3 is a schematic cross-section of the electrical machine of FIG. 2 according to the plane III-III.

As shown in FIG. 2, the coils 9 have an enlarged portion 26, at the housing 20, 22, extending transversely to a radial direction of extension of the respective tooth 6.

In the preferred embodiment the housings 20, 22 are provided on the arms 18b, 19b at the outer part 18a, 19a of the front pieces 18, 19, that is, away from the end 6a of the stator tooth according to a radial direction.

In other words, the housings 20, 22 are provided on the arms 18b, 19b in a position away from the end 6a of the respective tooth 6 in such a way that the enlarged portion 26 is also away from the end 6a of the tooth.

In this way, close to the ends 6a of the teeth 6 there is space for the passage of the tools, known and not illustrated, which make the winding 10.

FIG. 4 shows that the housing 20 has a base wall 27 and a pair of lateral walls 28, 29 opposite each other and radially spaced.

The measurement, according to a direction parallel to the axis R of rotation, of the wall 28 determines the depth of the housing or throat 20.

The wall 28 has an upper edge 30, preferably rounded, away from the wall 27 from which a base wall 31 of the housing 21 extends in a radial direction.

The housing 21 is delimited at the radial ends by the wall 29 and by a wall 32 which extends from the base wall 31 according to a direction parallel to the axis R of rotation.

The housings 22, 23 are preferably shaped, respectively, like the housings 20, 21.

The housings 21, 23 are in practice partly superposed on the housings 20, 22 according to a direction parallel with the axis R of rotation.

As mentioned above, the turns 11a pass in the housing 20, 22 in a predetermined number and are preferably positioned in such a way that the layer 24 of the axially outermost turns 11a is substantially coplanar with the wall 32.

In practice, a base of the housing 21, 23 is formed by the base wall 31 and by the layer 24 of the axially outermost turns 11a.

The arms 18b, 19b, in the portion on which the conductors 8 are wound, therefore has a step at the wall 28.

The turns 11b are therefore wound partly on the wall 31 and partly on the turns 11a.

The walls 27, 28, 29, 31, 32 are designed in such a way that, given the number N of turns 11 and the diameter of the conductors 8, as a function of the performance expected from the motor 1, the turns 11b of the axially outermost layer 25 have the stretches of conductor of the end portion 12 abutted against the projection 16 all substantially coplanar with each other.

Preferably, the stretches of conductor of the end portion 12 abutted against the projection 16 form a plane parallel to the surface of the projection 16 facing towards the inside of the casing 2 against which the coils 9 are abutted.

In an alternative embodiment not illustrated, the housings for the conductors 8 provided in the front pieces 18, 19 for the coils 9 do not have steps and preferably have a flat base.

Also in this case, the front pieces 18, 19 are shaped, in particular a relative outer surface with respect to the core 4, in such a way that the end portions 12 of the coils 9 abutted against the projection 16 have at least one contact surface, comprising the stretches of the turns at the end portion 12, which is substantially flat.

In this way, the heat exchange surface 16 is maximised for each coil 9.

In an example embodiment, having fixed the geometry of the ferromagnetic core 4 to obtain an output of 500 Watt, a conductor with a diameter of 0.95 mm (without the insulating coating of the conductor) can be used for coils 9 with 34 turns.

The front pieces 18, 19 are therefore designed in such a way that two layers 24 of six turns each pass in the housing 20, 22 whilst two layers of eleven turns each pass in the housing 21, 23, the outermost of which has at least the stretches of conductor of the end portion 12 abutted against the projection 16 all substantially coplanar.

In an example embodiment, having fixed the geometry of the ferromagnetic core 4 to obtain an output of 850 Watts, a conductor with a diameter of 1.15 mm (without the insulating coating of the conductor) can be used for coils 9 with 21 turns.

The front pieces 18, 19 are therefore designed in such a way that two superposed layers of eleven and ten turns 11 are positioned in a single housing for all the coils 9, the outermost of which has at least the stretches of conductor of the end portion 12 abutted against the projection 16 all substantially coplanar.

In order to guarantee the correct positioning of the end portions 12 of the coils 9 inside the casing 2, in particular relative to the projection 16, the front pieces 18, 19, that is, the walls 27, 28, 29, 31, 32, are designed in such a way that the distance measured according to a direction parallel to the axis R of the stretches of conductor of the axially outermost end portions 12, that is, of the stretches of conductor of the end portion 12 coplanar with each other from the core 4, is equal to a predetermined value D.

The lateral wall 14 of the casing 2 has an annular contact surface 33 extending radially towards the inside of the casing 2 against which an outer annular portion 34 of the core 4 abuts.

A preferred embodiment of a machine 1 as described above, described only insofar as is necessary to understand the invention, given the number N of turns 11 and the diameter of the conductor, designs the front pieces 18, 19 and the housings 20, 21, 22, 23 in such a way that at least the turns 11b of the axially outermost layer 25 have the stretches of conductor of the end portion 12 abutted against the projection 16 all substantially coplanar.

More specifically, the number of turns 11b is determined which, positioned in the housing 21, 23 in an even number of layers 25, have at least the stretches of conductor of the end portion 12 abutted against the projection 16 all substantially coplanar and preferably positioned in a plane parallel to the surface of the projection 16 of contact of the coils 9.

After designing the housings, the turns N1 are wound on the stator teeth 6 passing through the housings 20, 22, preferably in an even number of layers 24.

Having defined the base of the housings 21, 23 also using the turns 11a, the layers 25 are wound, which can be positioned according to the design.

In order to guarantee that the above-mentioned distance measured according to a direction parallel to the axis R of the stretches of conductor of the axially outermost end portions 12 from the core 4 is equal to the predetermined value D, the stator 3 is pressed in a press, not described in detail, calibrated and controlled in height and force before being inserted in the casing 2.

In general, the method comprises a step of pressing the stator winding 10 according to a direction parallel to the axis R of rotation in such a way as to ensure the coplanarity at least of the stretches of conductor abutted against the projection 16.

During the pressing step the predetermined distance D is also calibrated.

The invention claimed is:

1. A method of making an electrical machine, comprising:
providing an electrical machine having an axis of rotation and comprising:
a casing comprising:
a base wall transversal to the axis of rotation;
at least one projection projecting from the base wall towards an inside of the casing according to a direction parallel to the axis of rotation,
a stator, comprising:
a ferromagnetic core including a plurality of pole shoes each having a respective end,
at least one conductor wound on the plurality of pole shoes to form a plurality of coils forming a stator winding,
a shaped insulator interposed between the ferromagnetic core and the stator winding, with a first coil of the plurality of coils of the stator winding comprising a predetermined number of turns wound on a first one of the plurality of pole shoes and including an end portion engaged with the projection,
wherein the shaped insulator comprises for the first coil, a first housing for a first number of first turns of the predetermined number of turns and a second housing for a second number of second turns of the predetermined number of turns, the first turns being positioned in the first housing and the second turns being positioned in the second housing, the first housing including a first base wall positioned outward from the first one of the plurality of pole shoes and the second housing including a second base wall positioned outward from the first one of the plurality of pole shoes, where a first height of the first base wall with respect to the first one of the plurality of pole shoes in a direction parallel to the axis of rotation is different than a second height of the second base wall with respect to the first one of the plurality of pole shoes in the direction parallel to the axis of rotation, an innermost layer of the first turns being positioned adjacent the first base wall and an innermost layer of the second turns being positioned adjacent the second base wall, wherein the predetermined number of turns includes a first layer in the end portion formed by stretches of both the first turns and the second turns, with the stretches being aligned to all have a same third height with respect to the first one of the plurality of pole shoes in the direction parallel to the axis of rotation, wherein the third height is greater than the first height and the second height, the first layer being an outermost layer of the first coil with respect to the first one of the plurality of pole shoes and being positioned to thermally engage the projection;

wherein the shaped insulator further comprises for the first coil a pair of flat lateral faces respectively positioned on opposite sides of a radial axis of the first one of the plurality of pole shoes, the pair of flat lateral faces extending in respective planes parallel to the axis of rotation and to the radial axis;

during manufacturing of the electrical machine, pressing the stator winding according to a direction parallel to the axis of rotation in such a way as to ensure the coplanarity of the stretches of the first layer abutting against the projection.

2. The method according to claim 1, wherein the shaped insulator comprises a housing for the first coil shaped according to the predetermined number of turns.

3. The method according to claim 1, wherein the first housing and the second housing are partly superposed according to a direction parallel to the axis of rotation, the second turns at least partly superposing the first turns.

4. The method according to claim 1, wherein the first turns in the first housing at least partially form a base of the second housing.

5. The method according to claim 1, wherein the shaped insulator comprises a first insulator associated with the ferromagnetic core and facing the base wall and a second insulator associated with the ferromagnetic core, positioned on an opposite side to the first insulator relative to the ferromagnetic core, the first and second housings being provided in the first insulator.

6. The method according to claim 5, wherein the second insulator comprises for the first coil a first housing for the first turns and a second housing for the second turns, the first turns being positioned in the first housing in the first and second insulator and the second turns being positioned in the second housing in the first and second insulator.

7. The method according to claim 6, wherein the first housing in the first insulator and the first housing in the second insulator are aligned according to a direction parallel to the axis of rotation.

8. The method according to claim 6, wherein the second housing in the first insulator and the second housing in the second insulator are aligned according to a direction parallel to the axis of rotation.

9. The method according to claim 5, wherein the first insulator and the second insulator are symmetrical relative to the ferromagnetic core at least at the plurality of pole shoes.

10. The method according to claim 1, wherein the first housing is shaped as a throat which extends in the shaped insulator according to a direction transversal to a radius of the stator.

11. The method according to claim 1, wherein the first housing is positioned on the first one of the plurality of pole shoes in a position radially away from the end.

12. The method according to claim 1, wherein the first housing includes and is delimited by a base wall extending substantially radially, by a first lateral wall and by a second lateral wall, the first and second lateral walls extending parallel to the axis of rotation and being opposite each other and radially spaced.

13. The method according to claim 12, wherein the second housing includes and is delimited
   by a base comprising a second base wall extending radially and a layer of the first turns,
   by the second lateral wall and
   by a third lateral wall extending parallel to the axis of rotation facing and radially spaced from the first lateral wall.

14. The method according to claim 1, wherein the stretches of the at least one conductor are positioned at a predetermined distance from the ferromagnetic core.

15. The method according to claim 1, wherein the casing include a lateral wall comprising an annular contact surface extending radially towards the inside of the casing, the ferromagnetic core comprising an outer annular portion abutting on the angular contact surface.

16. The method according to claim 1, wherein the pressing step comprises a step of pressing the stator winding to a desired height.

17. The machine according to claim 1, wherein the stretches of the at least one conductor, lie in a plane parallel to a surface of the projection of contact of the first coil.

18. The method according to claim 1, and further comprising providing the electrical machine with a heat conductive electrical insulator positioned between the first layer and the projection.

19. The method according to claim 1, wherein one of the first turns and the second turns is, with respect to the axis of rotation, positioned radially inwardly on the first one of the plurality of pole shoes and the other of the first turns and second turns is positioned radially outwardly on the first one of the plurality of pole shoes, and wherein a first width in a circumferential direction of the stator of the one of the first turns and the second turns that is positioned radially inwardly is less than a second width in the circumferential direction of the stator of the other of the first turns and the second turns that is positioned radially outwardly and wherein a gap, in the circumferential direction, between adjacent ones of the plurality of coils is greater at a radially inwardly position of the plurality of coils than if the first width was the same or greater than the second width.

* * * * *